United States Patent
Diestelhorst et al.

(10) Patent No.: US 9,152,509 B2
(45) Date of Patent: Oct. 6, 2015

(54) TRANSACTIONAL MEMORY CONFLICT MANAGEMENT

(75) Inventors: Stephan Diestelhorst, Dresden (DE); Martin Pohlack, Dresden (DE); Michael Hohmuth, Dresden (DE); David Christie, Austin, TX (US); Luke Yen, Ayer, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 926 days.

(21) Appl. No.: 13/324,011

(22) Filed: Dec. 13, 2011

(65) Prior Publication Data
US 2013/0151791 A1  Jun. 13, 2013

(51) Int. Cl.
| | |
|---|---|
| G06F 13/28 | (2006.01) |
| G06F 13/00 | (2006.01) |
| G06F 11/14 | (2006.01) |
| G06F 9/30 | (2006.01) |
| G06F 9/38 | (2006.01) |
| G06F 11/00 | (2006.01) |
| G06F 9/46 | (2006.01) |
| G06F 9/52 | (2006.01) |

(52) U.S. Cl.
CPC .......... *G06F 11/1474* (2013.01); *G06F 9/3004* (2013.01); *G06F 9/30087* (2013.01); *G06F 9/3834* (2013.01); *G06F 9/3861* (2013.01); *G06F 9/467* (2013.01); *G06F 9/528* (2013.01); *G06F 11/00* (2013.01); *G06F 2209/521* (2013.01)

(58) Field of Classification Search
CPC ..... G06F 9/30087; G06F 9/52; G06F 9/3004; G06F 9/3834; G06F 9/3861; G06F 9/528; G06F 11/174; G06F 2201/87; G06F 2209/521
See application file for complete search history.

(56) References Cited

U.S. PATENT DOCUMENTS

| | | | |
|---|---|---|---|
| 2007/0162520 A1* | 7/2007 | Petersen et al. | 707/202 |
| 2011/0167222 A1* | 7/2011 | Lee et al. | 711/118 |
| 2011/0296148 A1* | 12/2011 | Cain et al. | 712/228 |

OTHER PUBLICATIONS

Dice et al., "Early Experience with a Commercial Hardware Transactional Memory Implementation", Mar. 7-11, 2009, 12 pages.
Saha et al., "Architectural Support for Software Transactional Memory", The 39th Annual IEEE/ACM International Symposium on Microarchitecture (MICRO '06), 2006, 12 pages.

* cited by examiner

*Primary Examiner* — Edward Dudek, Jr.
(74) *Attorney, Agent, or Firm* — Harrity & Harrity, LLP

(57) ABSTRACT

A computing device initiates a transaction, corresponding to an application, which includes operations for accessing data stored in a shared memory and buffering alterations to the data as speculative alterations to the shared memory. The computing device detects a transaction abort scenario corresponding to the transaction and notifies the application regarding the transaction abort scenario. The computing device determines whether to abort the transaction based on instructions received from the application regarding the transaction abort scenario. When the transaction is to be aborted, the computing device restores the transaction to an operation prior to accessing the data stored in the shared memory and buffering alterations to the data as speculative alterations to the shared memory. When the transaction is not to be aborted, the computing device enables the transaction to continue.

20 Claims, 7 Drawing Sheets

TRANSACTIONAL MEMORY CONFLICT MANAGEMENT

BACKGROUND

Hardware Transactional Memory (HTM) is a mechanism in computer architecture for supporting parallel programming. With HTM, programmers may declare a group of instructions as a transaction and the HTM system guarantees that the instructions in the transaction are executed in an atomic and isolated way. Atomicity means that all the instructions of the transaction are executed as a single atomic block with respect to all other concurrent threads. Isolation means that no intermediate result of the transaction is exposed to the rest of the system until the transaction completes. HTM systems may allow transactions to run in parallel as long as they do not conflict. Two transactions may conflict when they both access the same memory area and either of the two transactions writes to that memory area.

Handling transaction conflicts often includes notifying the currently running application of the transaction conflict using a synchronous notification or an asynchronous notification. A synchronous notification may include notifying the application of the transaction conflict by diverting a control flow of the transaction to an abort handler that may cause the transaction to abort and restart. By contrast, an asynchronous notification often requires the application to proactively query transaction conflict information without prior notification.

Unfortunately, synchronous notifications and asynchronous notifications fail to provide adequate solutions to notifying an application of a transaction conflict. For example, some applications may be adversely affected by the abrupt nature with which synchronous notification diverts control flows, aborts transactions, and restarts transactions. Also, the information queries required by asynchronous notification can be a significant source of unwanted overhead in a transactional memory system.

SUMMARY OF EMBODIMENTS

According to one implementation, a method may include: initiating, by a computing device, a transaction corresponding to an application, where the transaction comprises operations for accessing data stored in a shared memory, and buffering alterations to the data as speculative alterations to the shared memory; detecting, by the computing device, a transaction abort scenario corresponding to the transaction; notifying, by the computing device, an application, corresponding to the transaction, regarding the transaction abort scenario; determining, by the computing device, whether to abort the transaction based on instructions received from the application regarding the transaction abort scenario; restoring, by the computing device and when the transaction is to be aborted, the transaction to an operation prior to accessing the data stored in the shared memory and buffering alterations to the data as speculative alterations to the shared memory; and enabling, by the computing device and when the transaction is not to be aborted, the transaction to continue.

According to another implementation, a computing device may include: a memory for storing instructions; and a processor, connected to the memory, to: initiate a transaction corresponding to an application, where the transaction comprises operations to access data stored in a shared memory, and buffer alterations to the data as speculative alterations to the shared memory. The processor is further to detect a transaction abort scenario corresponding to the transaction, notify an application, corresponding to the transaction, regarding the transaction abort scenario, determine whether to abort the transaction based on instructions received from the application regarding the transaction abort scenario, restore, when the transaction is to be aborted, the transaction to an operation prior to accessing the data stored in the shared memory and buffering alterations to the data as speculative alterations to the shared memory, store, when the transaction is not to be aborted, a notification of the transaction abort scenario in a thread local variable that is accessible by the application, and enable the transaction to continue beyond the transaction abortion scenario.

According to another implementation, one or more non-transitory computer-readable storage media may include: one or more instructions that, when executed by a processor, cause the processor to initiate a transaction corresponding to an application, where the transaction comprises operations to access data stored in a shared memory, and buffer alterations to the data as speculative alterations to the shared memory; cause the processor to reserve a memory location for storing a continuation state corresponding to the transaction; detect a transaction abort scenario corresponding to the transaction; create a continuation state corresponding to the transaction abortion scenario, where the continuation state comprises information describing processing conditions at a time of the transaction abort scenario; notify an application, corresponding to the transaction, regarding the transaction abort scenario; determine whether to abort the transaction based on instructions received from the application regarding the transaction abort scenario; restore, when the transaction is to be aborted, the transaction to an operation prior to accessing the data stored in the shared memory and buffering alterations to the data as speculative alterations to the shared memory; and use, when the transaction is not to be aborted, the continuation state to restore processing conditions corresponding to the transaction abort scenario to enable the transaction to continue.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements.

Systems and/or methods described herein may utilize processor registers and/or processor mechanisms to detect a transaction conflict, notify a corresponding application of the transaction conflict, capture a continuation state corresponding to the transaction conflict, and store the continuation state in a known location. Since the continuation state may define the site of the transaction conflict, notifying the application of the transaction and capturing the continuation state may enable the application to decide whether to permit the transaction to be aborted or whether to return to the site of the transaction conflict and perform any additional operations that may be required so that the application may be in a safe state when the transaction is aborted and/or restarted. In addition, since the continuation state may be stored in a known location, the application may be free from performing overhead-creating operations, such as queries for transaction conflict information.

Figure 1:
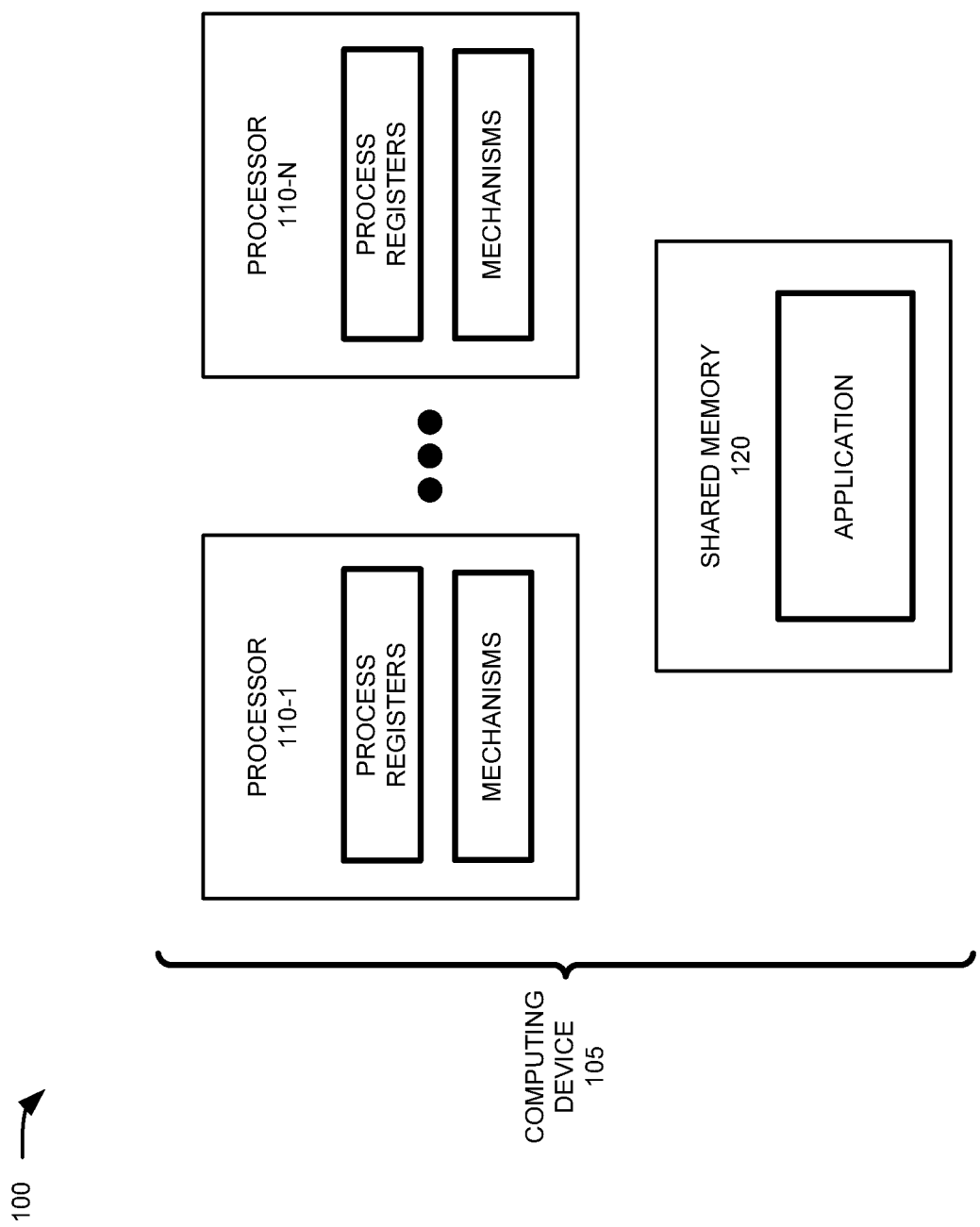
FIG. 1 is a diagram of an example transactional memory arrangement according to one or more embodiments described herein.

FIG. 1 is a diagram of an example overview 100 according to one or more embodiments described herein. As depicted, overview 100 may include a computing device 105, which may include processors 110-1, . . . , 110-N (where N≥1) (hereinafter referred to collectively as "processors 110," and individually as "processor 110"), and a shared memory 120. In one or more embodiments, overview 100 may correspond to a multi-processor computing environment configured to implement one or more mechanisms as discussed below.

Computing device 105 may include any type of computing and/or communication device. For example, computing device 105 may include a desktop computer, a laptop computer, tablet computer, a mobile communication device, a server, a cluster of servers, etc. As depicted in FIG. 1, computing device 105 may include multiple processors 110. However, in some embodiments, computing device 105 may only include a single processor 110.

Processor 110 may include any type or combination of processors, including a central processing unit (CPU), a graphics processing unit (GPU), a symmetric multi-processor (SMP), a chip multi-processor (CMP), a simultaneous multi-threading (SMT) system, etc. Processor 110 may include process registers that store information used during operations performed by processor 110. For instance, a process register may be used to store relatively small data structures (e.g., 8 bits, 32 bits, etc.) that are frequently used by processor 110 and/or are likely to be used in the near future (e.g., intermediate values corresponding to an ongoing transaction). Examples of processor registers may include data registers used to store numeric values, address registers used to store addresses corresponding to a location in a memory device (e.g., shared memory 120), constant registers used to store read-only values, etc.

Processors 110 also include mechanisms. The mechanisms may include instructions for implementing memory transactions or operations relating to memory transactions. For instance, the mechanisms may include a mechanism for capturing the state of an application involved in a memory transaction, a mechanism for restoring the application to a captured state, a mechanism for restoring the control flow of an aborted transaction in order to enable the transaction to resume, etc. In some embodiments, one or more of the mechanisms may correspond to an Advanced Synchronization Facility (ASF) mechanism.

Shared memory 120 may include any type or combination of devices capable of storing information. Examples of shared memory 120 may include a random access memory (RAM), flash memory, etc. As depicted, shared memory 120 may include an application, which may include a software program or set of logical instructions capable of utilizing transactional memory operations (e.g., transactions) to access, create, alter, and/or delete information. The application may also, or alternatively, include instructions for handling transaction conflicts, which may include transaction conflicts that may result in the transaction being aborted and/or restarted.

Figure 2:
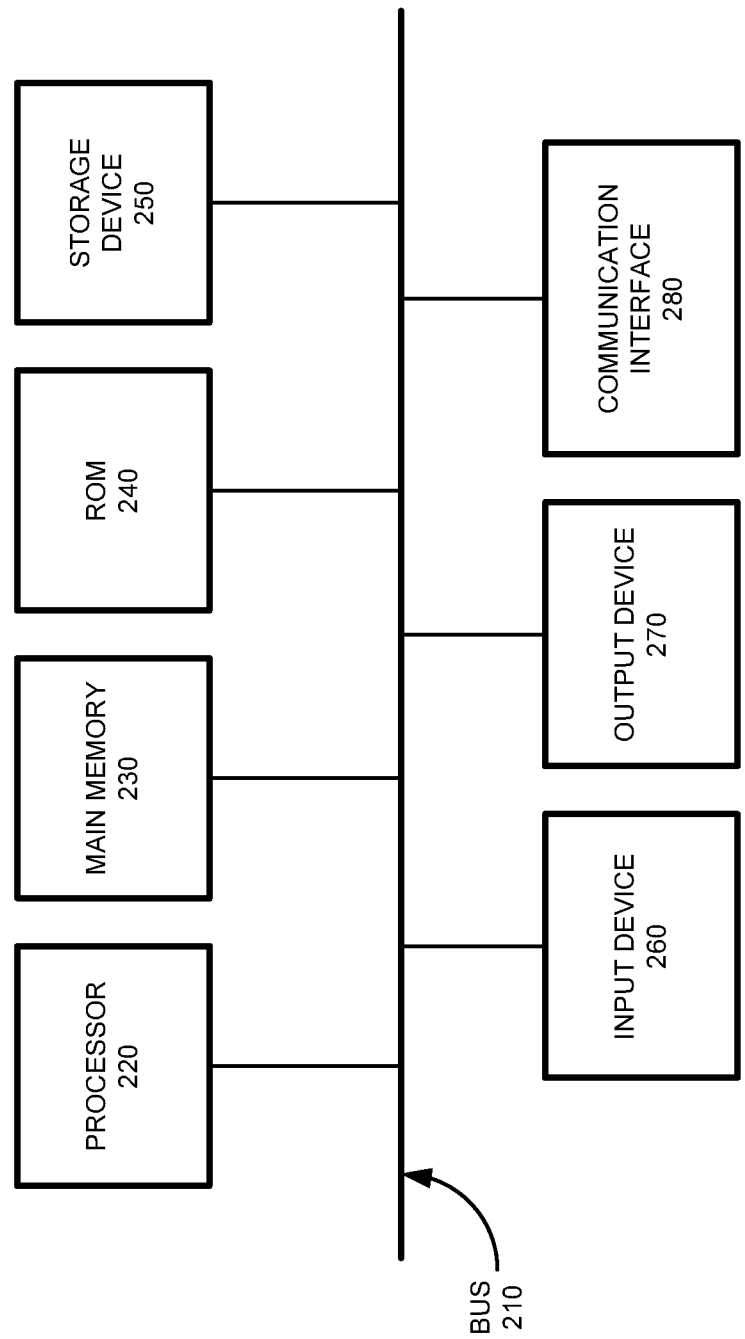
FIG. 2 is a diagram of example components of a device that may include the transaction memory arrangement of FIG. 1.

FIG. 2 is a diagram of an example of a device 200 that may correspond to computing device 105. For example, device 200 may include a personal computer, a desktop computer, a laptop computer, a tablet computer, a server device, a radiotelephone, a personal communications system (PCS) terminal, a personal digital assistant (PDA), a cellular telephone, a smart phone, and/or other types computation or communication devices.

As illustrated in FIG. 2, device 200 may include a bus 210, processor 220, a main memory 230, a read-only memory (ROM) 240, a storage device 250, an input device 260, an output device 270, and/or a communication interface 280. Bus 210 may include a path that permits communication among the components of device 200.

Processor 220 may correspond to processor 110 and may include one or more processors (e.g., multi-core processors), microprocessors, application-specific integrated circuits (ASICS), field-programmable gate arrays (FPGAs), a central processor (CPU), a graphical processor (GPU), or other types of processors that may interpret and execute instructions. In one example, processor 220 may include a single processor that includes multiple cores. Main memory 230 may include a RAM, a dynamic RAM (DRAM), and/or another type of dynamic storage device that may store information and instructions for execution by processor 220. ROM 240 may include a ROM device or another type of static storage device that may store static information and/or instructions for use by processor 220. Storage device 250 may include a magnetic and/or optical recording medium and its corresponding drive. In one example, one or more of main memory 230, ROM 240, and storage device 250 may correspond to shared memory 120.

Input device 260 may include a mechanism that permits an operator to input information to device 200, such as a keyboard, a mouse, a pen, a microphone, voice recognition and/or biometric mechanisms, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processor 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processor 220 to perform processes described herein. Alternatively, hardwired circuitry may be used in place of or in combination with software instructions to implement processes described herein. Thus, embodiments described herein are not limited to any specific combination of hardware circuitry and software.

Although FIG. 2 shows example components of device 200, in other embodiments, device 200 may include fewer components, different components, differently arranged components, or additional components than depicted in FIG.

2. Alternatively, or additionally, one or more components of device 200 may perform one or more other tasks described as being performed by one or more other components of device 200.

Figure 3:
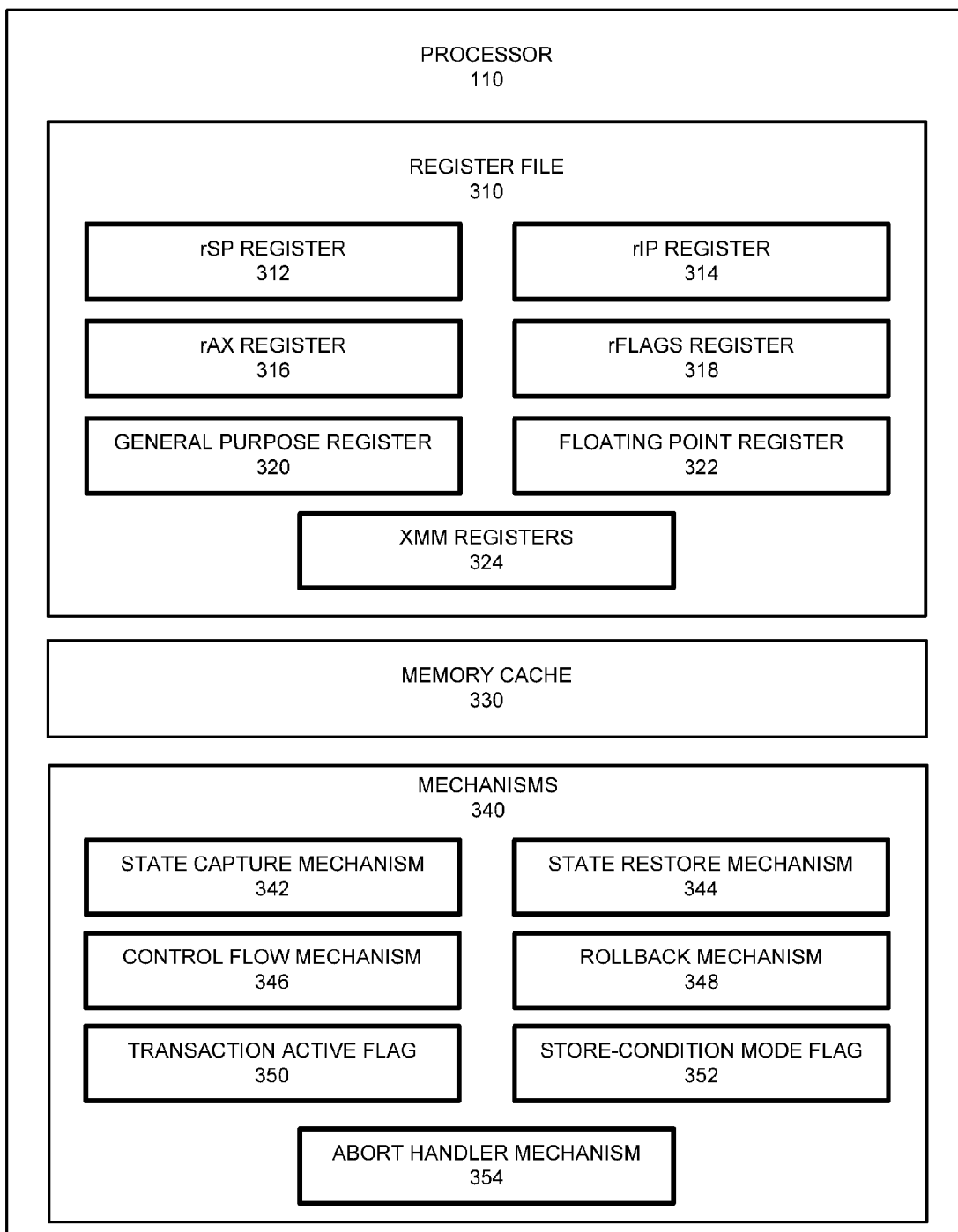
FIG. 3 is a diagram of example components of a processor according to one or more embodiments described herein.

FIG. 3 is a diagram of an example processor 220 according to one or more embodiments described herein. As depicted, processor 220 may include a register file 310 that includes a rSP register 312, a rIP register 314, a rAX register 316, a rFLAGS register 318, a general purpose register 320, a floating point register 322, and extended memory management (XMM) registers 324. Processor 220 also includes a memory cache 330 and mechanisms 340 that include a state capture mechanism 342, a state restore mechanism 344, a control flow management mechanism 346, a rollback mechanism 348, a transaction active flag 350, a store-condition mode flag 352, and an abort handler mechanism 354.

As mentioned above, register file 310 may include an array of processor registers (e.g., rSP register 312, rIP register 314, etc.) and may be implemented using static RAM or another type of memory. Processor registers 312-324 may each include an amount of storage space (e.g., 8-bits, 32-bits, etc.) consistent with the purpose or function of each processor register. For example, rSP register 312 may include a stack pointer that indicates a current top of a call stack (not shown in FIG. 3). rIP register 314 may include an instruction pointer or program counter that indicates a current location within an instruction sequence in the call stack. rAX register 316 (e.g., an accumulator register) may include a temporary storage location for intermediate arithmetic or logical results or values. rFLAGS register 318 may include information regarding a process mode (e.g., an abort mode) corresponding to an application being executed. General purpose register 320 may include a processor register for temporarily storing any type of transient data while executing an application, a transaction, or performing another type of operation. Floating point register 332 may include a storage location for storing numerical values that may vary in terms of numerical value and significant digits. XMM registers 324 may include processor registers with extended memory space (e.g., 128-bit registers) for temporarily storing transient data while executing an application or performing another type of operation.

Memory cache 330 may include a transparent and temporary storage component for storing local copies of values in shared memory 120. Mechanisms 340 may include data structures and/or instructions for implementing memory transactions or operations relating to memory transactions. For instance, state capture mechanism 342 may include a mechanism for capturing the state of an application involved in a memory transaction. State restore mechanism 344 may include a mechanism for restoring the application to a captured state. Control flow management mechanism 346 may include a mechanism for restoring the control flow of an aborted transaction in order to resume execution of the transaction. Rollback mechanism 348 may include a mechanism for undoing or rolling back memory changes associated with an aborted transaction. Transaction active flag 350 may include a flag to indicate whether a transaction is active. Store-condition mode flag 352 may include a flag to indicate a transactional mode (e.g., a speculative transaction mode or another type of mode). Abort handler mechanism 354 may include instructions for handling or assisting with transaction abortion operations.

The processing components (e.g., registers, memory cache, mechanisms, etc.) of processor 220, as illustrated in FIG. 3, are provided for explanatory purposes only. In practice, processor 220, as described herein, may include additional processing components, fewer processing components, different processing components, or differently arranged processing components than illustrated in FIG. 3. For instance, processor 220 may also, or alternatively, include one or more additional registers, such as a rDX register, a rCX register, and/or a r9 register that may be used for integer and pointer arguments. Also, in some embodiments, one or more of the processor components of processor 220 may perform one or more functions described as being performed by another one or more of the processing components of processor 220.

Figure 4:
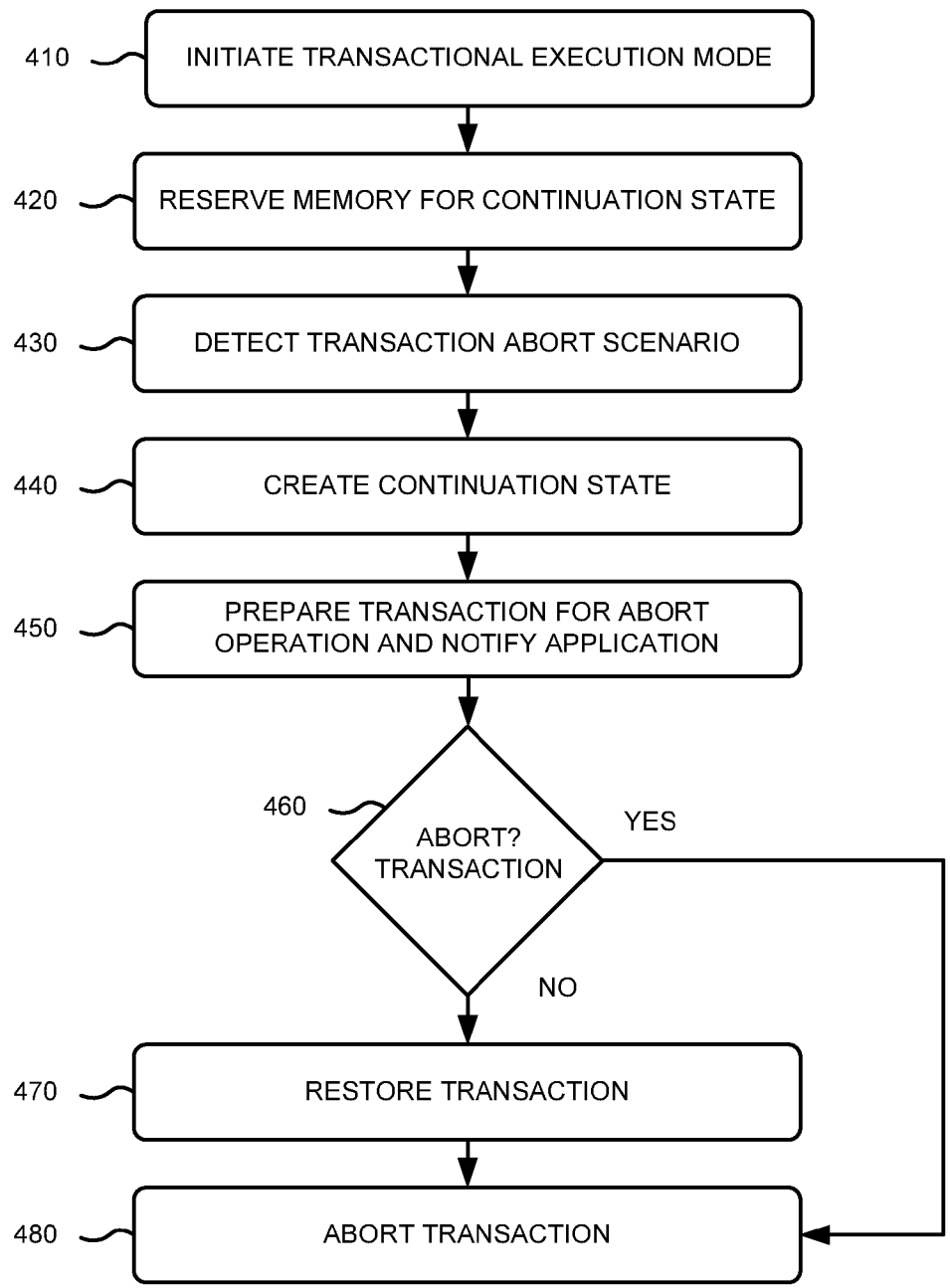
FIG. 4 is a flow chart of an example process for capturing a continuation state according to one or more embodiments described herein.

FIG. 4 is a diagram of an example process 400 for capturing a continuation state according to one or more embodiments described herein. In one or more embodiments, process 400 may be performed by one or more components of processor 220. Alternatively, or additionally, one or more blocks of process 400 may be performed by one or more other components/devices, or a group of components/devices, including or excluding processor 220. A description of FIG. 4 is provided below with reference to FIGS. 5A-5C.

As shown in FIG. 4, process 400 may include initiating a transactional execution mode (block 410). For example, processor 220 may enter into a transactional execution mode. In one embodiment, the processor 220 may enter into the transactional execution mode in response to an application executing one or more instructions to initiate a transaction involving shared memory 120. As part of the transactional mode, processor 220 may be configured to buffer data accessed or altered by the transaction as speculative, meaning that the alterations imposed on the data by the transaction may, or may not, be committed to memory at a later point.

As further shown in FIG. 4, process 400 may include reserving memory for a continuation state (block 410). For example, processor 220 may reserve a section of main memory 230 for storing a continuation state. As mentioned above, the continuation state may include one or more types of information that may be used to describe a state of a transaction at the time of a transaction conflict being detected. Examples of such information may include a stack pointer value (e.g., an rSP register value), an instruction pointer value (e.g., a rIP register value), a current state of processor 220, a current state of the application, a current state of the transaction, etc. In some embodiments, processor 220 may reserve memory for the continuation state as part of initiating the transactional execution mode mentioned above. Additionally, or alternatively, the continuation state may be included in a call stack corresponding to the transaction. For instance, when processor 220 enters into a transactional mode of operation, processor 220 may execute an operation, such as a SPECULATE operation. The SPECULATE operation may cause processor 220 to move a stack pointer (e.g., a rSP register value) of the stack by a certain amount in order to create a reserved portion of memory for storing the continuation state. The SPECULATE instructions may also, or alternatively, ensure that processor 220 is aware of the reserved memory location.

Figure 5A:
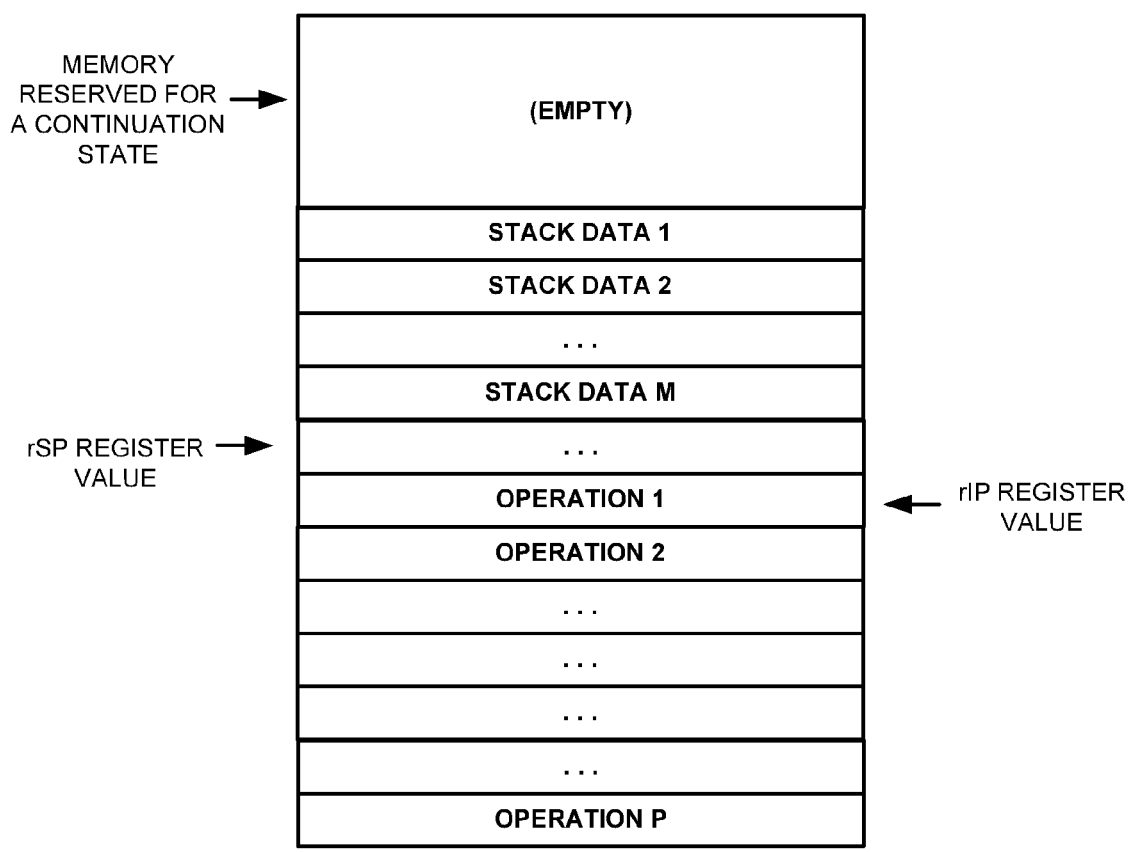
FIGS. 5A-5C are diagrams of an example call stack according to one or more embodiments described herein.

FIG. 5A is a diagram of an example memory 500 in accordance with one or more embodiments described herein. As depicted, memory 500 may include stack data (e.g., stack data 1, stack data 2, . . . , and stack data R (where R≥1)), a series of operations (e.g., operation 1, operation 2, . . . , and operation M (where M≥1)). Memory 500 may include a reserved memory location for a continuation state; however, the reserved memory location may be empty since a transaction abort scenario has not been detected. Additionally, an instruction pointer registry value (e.g., the rIP register value) may be pointing to the first operation (e.g., operation 1) in memory 500, and the stack pointer value (e.g., the rSP register value) may be pointing to the beginning size of the stack.

In one embodiments, upon executing a SPECULATE instruction, processor 220 may implicitly reserve the memory for the continuation state within memory 500 by adjusting the memory location of an original stack pointer (e.g., rSP register value). In such embodiments, the stack pointer depicted in FIG. 5A may actually be the second stack pointer assigned to call stack by processor 220. Processor 220 may store the original stack pointer in a processor register (e.g., rDX register) and may reintroduce the original stack pointer to the call stack if the application decides to immediately, or without delay, abort the transaction. This may have the effect of eliminating the memory reserved for the continuation state and resetting the original size of the call stack. Additionally, or alternatively, storing the original stack pointer in a processor register may be used to direct processor 220 to the continuation state if the application decides to forego having the transaction aborted immediately or without delay. As mentioned above, the continuation state may be used to restore processor register values, memory conditions, or other conditions corresponding to the transaction abort scenario.

Returning to FIG. 4, process 400 may include detecting a transaction abort scenario (block 430). For example, processor 220 may detect a transaction abort scenario. As mentioned above, a transaction abort scenario may result from read/write conflicts involving processors, applications, transactions, and/or threads with access to part or all of the memory location. For example, processor 220 may detect a transaction abort scenario when different transactions are attempting to write to or alter the same segment of memory. Alternatively, or additionally, processor 220 may detect a conflict when one transaction is attempting to alter a segment of memory that is being viewed by another transaction. However, a transaction abort scenario may result from other conditions as well, such as a speculative buffer overflow (e.g., when the storage capacity of a portion of memory dedicated to buffering speculative transaction operations is exceeded).

As further shown in FIG. 4, process 400 may include creating a continuation state corresponding to the transaction conflict (block 440). For example, processor 220 may create a continuation state that corresponds to a detected transaction conflict. In one embodiment, the continuation state may describe one or more processing conditions at the time of the transaction conflict. For example, the continuation state may include a rIP register value from the rIP register 314 (e.g., an instruction pointer value that indicates a current location within call stack 500), a rAX register value from rAX register 316 (e.g., an intermediate arithmetic or logical result or value corresponding to the pending transaction), a rFLAGS register value from rFLAGS register 318 (e.g., information regarding a process state corresponding to a transaction being executed), a rDX register value from a rDX register value (e.g., a value used for integer and pointer arguments), or another type of information capable of describing circumstances regarding the transaction conflict. The continuation state may be stored in the portion of memory that was previously reserved (e.g., the call stack).

Figure 5B:
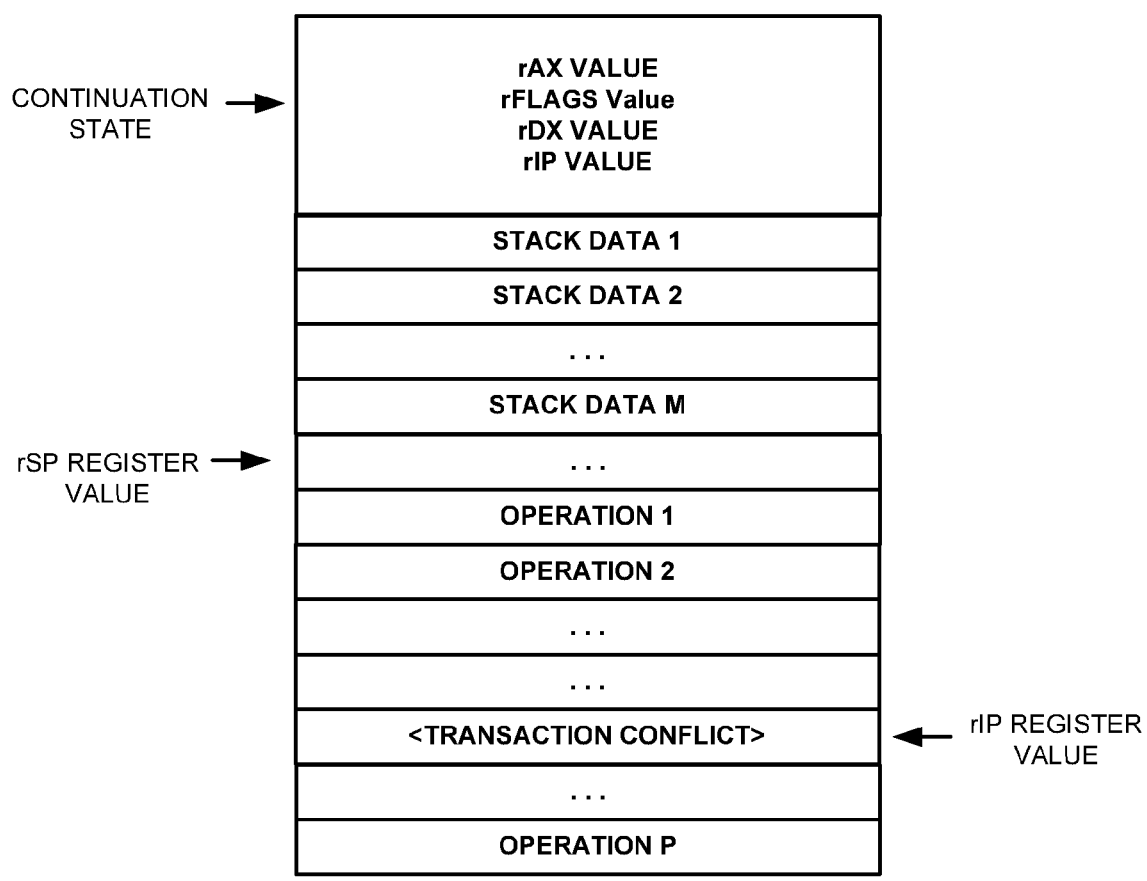

FIG. 5B is a diagram of an example memory 500 in accordance with one or more embodiments described herein. Memory 500 may include a call stack at or near the site of a transaction conflict (e.g., a transaction abort scenario). For example, a continuation state (e.g., the rAX register value, rFLAGS register value, rDX register value, rIP register value, etc.) is stored in the reserved memory location, and the instruction pointer registry value (e.g., the rIP register value) is pointing to the operation corresponding to the transaction conflict. However, despite the alterations depicted in memory 500, the stack pointer value has not changed, which may help ensure that the memory reserved for the continuation state remains intact.

Returning to FIG. 4, process 400 may include preparing the transaction for an abort operation and notifying the application (block 450). For example, processor 220 may prepare the transaction for an abort operation and notify the application of the pending abort operation. Processor 220 may divert the control flow corresponding to the transaction to abort handler mechanism 358 and/or signal the application that an abort operation is pending. In one embodiment, diverting the control flow may act as a notification to the application of the pending abort operation. Additionally, or alternatively, a notification of the pending abort operation may be stored in a thread local variable, and the application may be notified of the pending abort operation when the application accesses the thread local variable. Storing the notification in a thread local variable may eliminate the need for overhead creating operations, such as performing queries for abort scenario information as discussed above with reference to asynchronous notification.

As further shown in FIG. 4, process 400 may include determining whether to abort the transaction (block 460). For example, processor 220 may determine whether the application would like to abort the transaction without delay, or whether the application would like to abort the transaction at a later point. In some scenarios, the application may decide to abort the transaction immediately, or without delay, so that, for example, the transaction may be restarted as soon as possible. However, in other scenarios, the application may determine that it would be detrimental or risky to immediately abort the transaction due to, for example, the current state of the application. As such, the application may decide to proceed with the transaction until the application reaches a safe state, such as a point in the transaction where aborting the transaction would not be as dangerous to the integrity of the application or a point in the transaction where restarting the transaction would be easier, a more natural transition, or otherwise preferred.

If the transaction is not to be aborted (block 460—No), process 400 may include restoring the transaction. For example, processor 220 may restore the transaction if the transaction is not aborted. In some embodiments, processor 220 may restore the transaction based on the continuation state stored in the call stack. For example, processor 220 may restore the rIP register value, the rFLAGS register value, the rAX register value, and/or the rDX register value based on the information stored in the continuation stack. As mentioned above, the continuation state may be created in response to the transaction abort scenario being detected. As such, the continuation state may be used to restore the transaction to the transaction conflict site so that the transaction may continue. In one embodiment, the application may be involved in restoring the transaction, which may include the application assigning the rSP register value based on a Red Zone or a similar construct that may be applicable, copying the continuation state to the new rSP location, using the continuation state to restore a rAX register and a rDX register value, restore rFLAG register values using POPF instructions, restore the rIP register value using RET <imm> instructions, etc.

Figure 5C:
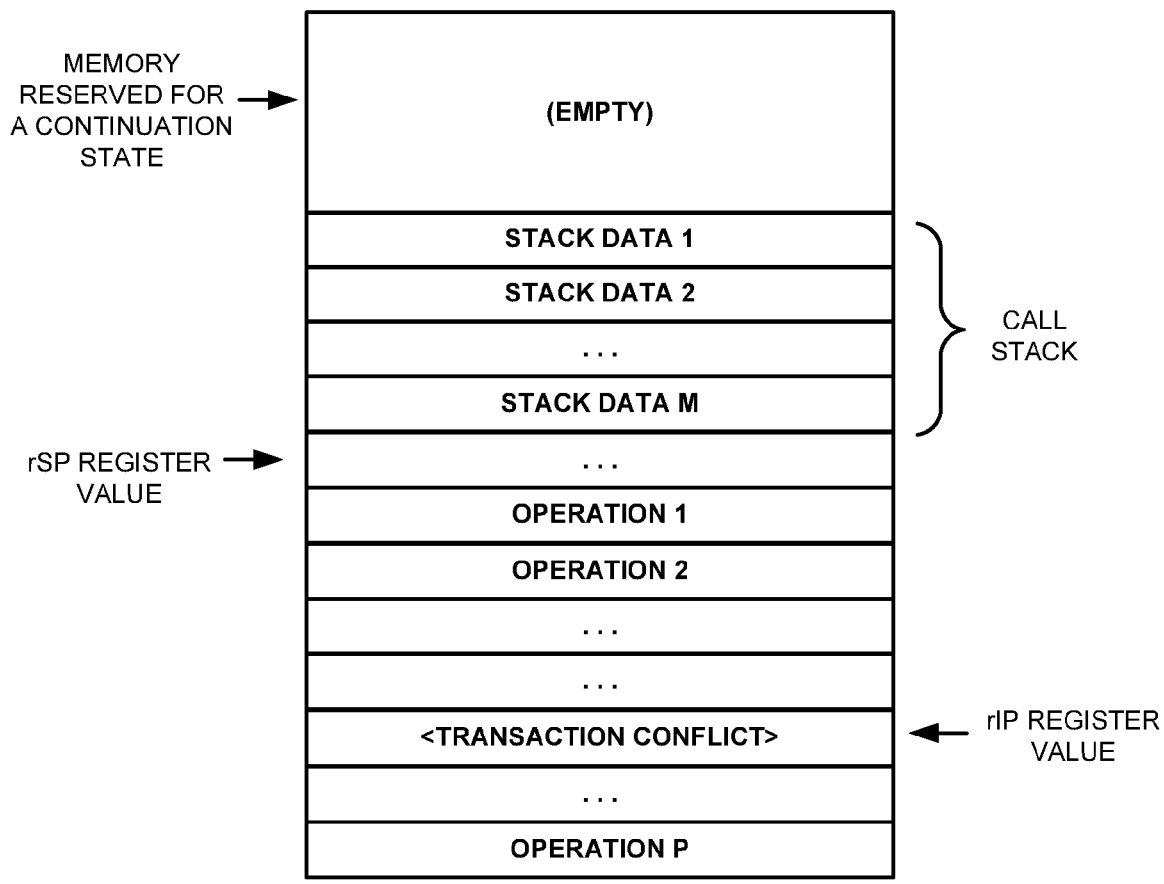

FIG. 5C is a diagram of an example memory 500 in accordance with one or more embodiments described herein. Memory 500 may correspond to a scenario where a continuation state data structure has been used to restore a transaction. For example, as depicted in FIG. 5C, the portion of memory reserved for the continuation state no longer includes the continuation state (e.g., the rAX register value, rFLAGS register value, rDX register value, rIP register value, etc.), and the instruction pointer (e.g., rIP register value) is pointing to the operation corresponding to the previously detected transaction conflict. As mentioned above with reference to FIG. 5B, the stack pointer value continues to point at operation_M.

Returning now to FIG. 4, if the transaction is to be aborted (block 460—Yes), process 400 may include aborting the transaction (block 480). For example, processor 220 may abort the transaction. In one embodiment, at some point after the transaction is restored, processor 220 may continue to process the transaction and, when the transaction reaches a safe state, the transaction may be aborted. Processor 220 may abort the transaction by undoing or rolling back one or more operations performed during the transaction. Additionally, or alternatively, at some point after the transaction is aborted, the application may restart the transaction (e.g., without the transaction conflict). One or more of the foregoing operations may be performed by the application, processor 220, a processor register, or another feature or component discussed herein.

While FIG. 4 shows a flowchart of an example process 400 for capturing a continuation state, in other embodiments, a process for identifying communication session records may include fewer operations, different operations, differently arranged operations, or additional operations than depicted in FIG. 4.

Further, one or more of the operations described above with reference to FIG. 4 may be performed to enable communication between threads of the same or different applications running on different cores in a symmetric multi-processor, chip multi-processor, or another type of processor 220. For example, a first transaction (e.g., thread) may only read a specific memory location in shared memory 130. If a second transaction (e.g., thread) wants to send a message to the first transaction, the second transaction may do so by modifying one or more of the specific memory locations read by the first transaction, which may create a transaction conflict or a transaction abort scenario. The first transaction may be notified of the transaction conflict and may have an opportunity (either before or after deciding to abort the transaction) to read the memory modification submitted by the second transaction, thereby enabling the transaction, or the application corresponding to the transaction, to respond accordingly.

Systems and/or methods described herein may utilize processor registers and/or processor mechanisms to detect a transaction conflict (e.g., transaction abort scenarios), notify the corresponding application of the transaction conflict, capture a continuation state corresponding to the transaction conflict, and store the continuation state in a known location. Since the continuation state may define the site of the transaction conflict, notifying the application of the transaction and capturing the continuation state may enable the application to decide whether to permit the transaction to be aborted or whether to return to the site of the transaction conflict and perform any additional operations that may be required so that the application may be in a safe state when the transaction is aborted and/or restarted. In addition, since the continuation state may be stored in a known location, the application may be free from performing overhead-creating operations, such as queries for transaction conflict information.

The foregoing description of embodiments provides illustration and description, but is not intended to be exhaustive or to limit the disclosure to the precise form disclosed. Modifications and variations are possible in light of the above teachings or may be acquired from practice of the disclosure.

For example, while a series of blocks has been described with regard to FIG. 3, the order of the blocks may be modified in other embodiments. Further, non-dependent blocks may be performed in parallel.

It will be apparent that aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein. The software may also include hardware description language (HDL), Verilog, Register Transfer Level (RTL), Graphic Database System (GDS) II data or the other software used to describe circuits and arrangement thereof. Such software may be stored in a computer readable media and used to configure a manufacturing process to create physical circuits capable of operating in manners which embody aspects of the present disclosure.

Further, certain embodiments described herein may be implemented as "logic" that performs one or more functions. This logic may include hardware, such as a processor, an ASIC, or a FPGA, or a combination of hardware and software.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, block, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   initiating, by a computing device, a transaction corresponding to an application,
   the transaction comprising operations for accessing data stored in a shared memory;
   buffering, by the computing device, alterations to the data as speculative alterations to the shared memory;
   reserving, by the computing device, a first memory location for storing a continuation state corresponding to the transaction,
   the continuation state being associated with information stored in a second memory location that is different from the first memory location;
   detecting, by the computing device, a transaction abort scenario corresponding to the transaction;
   storing, by the computing device and based on detecting the transaction abort scenario, the continuation state in the first memory location,
   storing, by the computing device and based on detecting the transaction abort scenario, a notification of a pending abort operation in the second memory location;
   determining, by the computing device and based on instructions received from the application regarding the transaction abort scenario, whether the transaction is to be aborted without delay; and selectively:
restoring, by the computing device when the transaction is not to be aborted without delay, the transaction to the continuation state stored in the first memory location based on the notification of the pending abort operation stored in the second memory location; or restoring, by the computing device when the transaction is to be aborted without delay, the transaction to an operation prior to buffering the alterations to the data as speculative alterations to the shared memory.

2. The method of claim 1, where determining whether the transaction is to be aborted without delay further comprises:
determining that the transaction is not to be aborted without delay; and
where the method further comprises:
enabling, based on determining that the transaction is not to be aborted without delay, the transaction to continue.

3. The method of claim 1, where storing the notification of the pending abort operation comprises:
storing, when the transaction is not to be aborted without delay, the notification of the pending abort operation in a thread local variable that is accessible by the application.

4. The method of claim 1, further comprising:
creating the continuation state,
where the continuation state comprises information describing a processing condition at a time of the transaction abort scenario, and
where restoring the transaction to the continuation state comprises:
using the continuation state to restore the processing condition corresponding to the transaction abort scenario.

5. The method of claim 1, where reserving the first memory location for storing the continuation state comprises:
storing a copy of an original stack pointer, corresponding to a call stack associated with the transaction, in a processor register; and
adjusting the original stack pointer to:
create a new stack pointer corresponding to the transaction, and
associate the original stack pointer with the first memory location for storing the continuation state.

6. The method of claim 1, where restoring the transaction to the continuation state comprises at least one of:
updating one or more processor registers based on the continuation state; or
restoring an instruction pointer to a location in a call stack corresponding to the transaction abort scenario.

7. The method of claim 1, further comprising:
preparing the transaction for an abort operation based on detecting the transaction abort scenario,
where preparing the transaction for the abort operation comprises:
updating a processor register to reflect processing conditions at a time when the transaction abort scenario is detected; and
setting an instruction pointer to a location in a call stack that is accessed prior to accessing the data stored in the shared memory.

8. The method of claim 1, further comprising:
detecting the transaction abort scenario by at least one of:
detecting an attempt, by another transaction, to change the data stored in the shared memory;
detecting an attempt, by another application, to change the data stored in the shared memory;
detecting an attempt to alter the data stored in the shared memory; or
detecting that the data stored in the shared memory is being accessed by another transaction.

9. A computing device comprising:
a processor, in communication with a memory device, to:
initiate a transaction corresponding to an application,
the transaction comprising operations to access data stored in a shared memory;
buffer alterations to the data as speculative alterations to the shared memory;
reserve a first memory location for storing a continuation state corresponding to the transaction,
the continuation state being associated with information stored in a second memory location that is different from the first memory location;
detect a transaction abort scenario corresponding to the transaction;
store the continuation state in the first memory location based on detecting the transaction abort scenario;
store a notification of a pending abort operation in the second memory location based on detecting the transaction abort scenario;
determine, based on instructions received from the application regarding the transaction abort scenario, whether the transaction is to be aborted without delay; and
selectively:
restore, when the transaction is not to be aborted without delay, the transaction to the continuation state stored in the first memory location based on the pending abort operation stored in the second memory location; or
restore, when the transaction is to be aborted without delay, the transaction to an operation prior to buffering the alterations to the data as speculative alterations to the shared memory.

10. The computing device of claim 9, where the processor is further to:
notify the application, corresponding to the transaction, regarding the transaction abort scenario;
enable, based on determining that the transaction is not to be aborted without delay, the transaction to continue; and
store the notification of the pending abort operation in a thread local variable that is accessible by the application.

11. The computing device of claim 9, where the processor is further to:
create the continuation state,
where the continuation state comprises information describing a processing condition at a time of the transaction abort scenario, and
where, when restoring the transaction to the continuation state, the processor is further to:
use the continuation state to restore the processing condition corresponding to the transaction abort scenario.

12. The computing device of claim 9, where, when reserving the first memory location for storing the continuation state, the processor is further to:
store a copy of an original stack pointer, corresponding to a call stack associated with the transaction, in a processor register; and
adjust the original stack pointer to:
create a new stack pointer corresponding to the transaction; and associate the original stack pointer with the first memory location for storing the continuation state.

13. The computing device of claim 9, where, when restoring the transaction to the continuation state, the processor is further to:
update one or more processor registers based on the continuation state; and
restore an instruction pointer to a location in a call stack corresponding to the transaction abort scenario.

14. The computing device of claim 9, where the continuation state identifies one or more processing conditions at a time when the transaction abort scenario is detected.

15. The computing device of claim 9, where, when detecting the transaction abort scenario, the processor is further to, at least one of:
detect an attempt, by another transaction, to change the data stored in the shared memory;
detect an attempt, by another application, to change the data stored in the shared memory;
detect an attempt to alter the data stored in the shared memory; or
detect that the data stored in the shared memory is currently accessed by another transaction.

16. One or more non-transitory computer-readable storage media, comprising:
one or more instructions that, when executed by a processor, cause the processor to:
initiate a transaction corresponding to an application, the transaction comprising operations to access data stored in a shared memory;
buffer alterations to the data as speculative alterations to the shared memory;
reserve a first memory location for storing a continuation state corresponding to the transaction,
the continuation state being associated with information stored in a second memory location that is different from the first memory location;
detect a transaction abort scenario corresponding to the transaction;
store the continuation state in the first memory location based on detecting the transaction abort scenario;
store a notification of a pending abort operation in the second memory location based on detecting the transaction abort scenario;
determine whether to abort the transaction without delay based on instructions received from the application regarding the transaction abort scenario; and
selectively:
restore, when the transaction is not to be aborted without delay, the transaction to the continuation state stored in the first memory location based on the notification of the pending abort operation stored in the second memory location; or
restore, when the transaction is to be aborted without delay, the transaction to an operation prior to buffering the alterations to the data as speculative alterations to the shared memory.

17. The computer-readable storage media of claim 16, where the one or more instructions are to cause the processor to:
create the continuation state,
where the continuation state comprises information describing processing conditions at a time of the transaction abort scenario; and
use, when the transaction is not to be aborted without delay, the continuation state to restore the processing conditions to enable the transaction to continue.

18. The computer-readable storage media of claim 16, where, when reserving the first memory location for storing the continuation state, the one or more instructions are to cause the processor to:
store a copy of an original stack pointer, corresponding to a call stack associated with the transaction, in a processor register; and
adjust the original stack pointer to:
create a new stack pointer corresponding to the transaction; and
associate the original stack pointer with the first memory location for storing the continuation state.

19. The computer-readable storage media of claim 16, where, when restoring the transaction to the continuation state, the one or more instructions are to cause the processor to:
update one or more processor registers based on the continuation state; and
set an instruction pointer to a location in a call stack corresponding to the transaction abort scenario.

20. The computer-readable storage media of claim 16, where, when restoring the transaction to the continuation state, the one or more instructions are to cause the processor to:
restore one or more register values that indicate processing conditions associated with the transaction abort scenario.

* * * * *